No. 692,399. Patented Feb. 4, 1902.
A. D. WILLIAMSON.
GAS PURIFIER.
(Application filed Nov. 5, 1900.)
(No Model.)
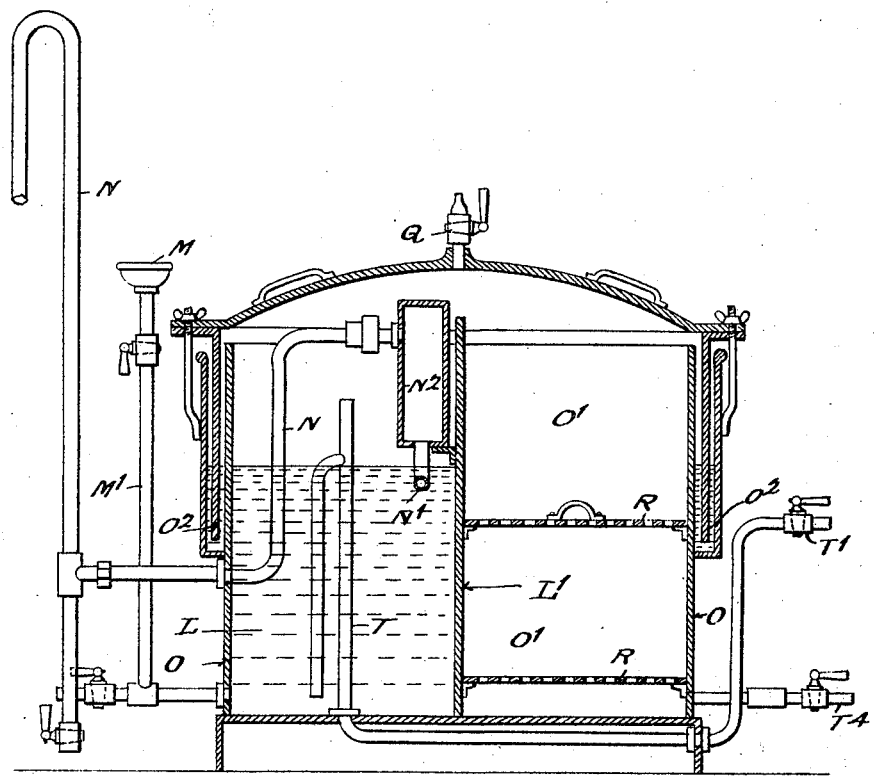
Witnesses
Inventor
A. D. Williamson
by his Attorney

UNITED STATES PATENT OFFICE.

ALEXANDER DAVIDSON WILLIAMSON, OF COLERAINE, IRELAND.

GAS-PURIFIER.

SPECIFICATION forming part of Letters Patent No. 692,399, dated February 4, 1902.

Original application filed May 22, 1899, Serial No. 717,833. Divided and this application filed November 5, 1900. Serial No. 35,576. (No model.)

*To all whom it may concern:*

Be it known that I, ALEXANDER DAVIDSON WILLIAMSON, a subject of the Queen of Great Britain, and a resident of Bridge street, Coleraine, in the county of Londonderry, Ireland, have invented an Improved Combined Liquid and Dry Purifier for Acetylene Gas, (being a division of application, Serial No. 717,833, filed May 22, 1899,) of which the following is a specification.

This invention relates to a combined liquid and dry purifier for acetylene gas.

The purifier consists of a vessel divided vertically into two compartments by a division-plate.

The improved purifier is constructed as follows, reference being had to the accompanying drawing, which is a vertical section thereof.

O is the purifier, preferably in the form of a circular vessel divided into two compartments L and O' by a vertical division-plate L'.

L is the liquid purifier, filled with hydrocarbon oil to the level of overflow stand-pipe T, provided with a regulating-cock T'. The feed-cup M at end of pipe M' is only used for supply when working. The siphon-pipe N, provided with an antisiphon-chamber $N^2$, prevents the liquid from flowing back into the condenser forming the subject-matter of a separate application filed concurrently herewith, Serial No. 35,575, or the gas returning after it passes through the perforated spray-pipe N', placed, say, one and a half inches below the surface of the oil. The gas being separated from the objectionable odor of unpurified acetylene passes over the division-plate L' into the dry purifier O', formed by perforated plates R or sections of trays. The upper portion of this dry purifier is filled with chlorinated powdered lime and the lower portion with oxid of iron. The gases rise out of the liquid purifier and then filter down through the dry purifying medium, where the gas is separated from the sulfureted hydrogen, phosphoreted hydrogen, and other impurities and also dried before passing into the gas-holder through pipe $T^4$.

The purifier is provided with a water seal, forming a safeguard against undue pressure, preferably by the lid being water-sealed, as at $O^2$, a relief-tap Q being fitted on the cover to allow air to pass in as cover is being removed and also to allow the air to escape from purifier when the cover is being replaced, also for preventing the water seal of the condenser and oil seal of purifier from being disturbed.

I declare that what I claim is—

1. In a combined liquid and dry purifier for acetylene gas the combination with a vessel O having a water-sealed cover and a division-plate L' vertically dividing said vessel into two compartments L and O' the former forming a liquid purifier containing carbon oil and the latter horizontally divided by perforated plates R or series of trays forming a dry purifier its upper part containing chlorinated powdered lime and its lower part oxid of iron, of a perforated spray-pipe N' provided with an antisiphon-chamber $N^2$ in the liquid purifier, and an overflow stand-pipe T for maintaining the level of liquid in said liquid purifier provided with inverted siphon-pipe to draw off spent liquid, a siphon-pipe N for admission of gas and a discharge-pipe leading from the dry purifier substantially as set forth.

2. In a combined liquid and dry purifier for acetylene gas the combination with a vessel O having a water-sealed cover and a division-plate L' vertically dividing said vessel into two compartments L and O' the former forming a liquid purifier containing carbon oil and the latter horizontally divided by perforated plates R or series of trays forming a dry purifier its upper part containing chlorinated powdered lime and its lower part oxid of iron, of a perforated spray-pipe N' in the liquid purifier and an overflow stand-pipe T for maintaining the level of liquid in said liquid purifier provided with regulating-cock T', a feed-cup M at end of pipe M' for supply of oil during working, a siphon-pipe N exterior of vessel O provided with an antisiphon-chamber $N^2$ for preventing the liquid from flowing back or the gas returning after it has passed through said perforated spray-pipe N', a relief-tap in the cover of said vessel O and a discharge-pipe leading from the dry purifier substantially as set forth.

In witness whereof I have signed this specification in the presence of two witnesses.

ALEXANDER DAVIDSON WILLIAMSON.

Witnesses:
SAMUEL CUNNINGHAM,
JAMES CRAWFORD.